(12) United States Patent
Tamasanis

(10) Patent No.: US 8,786,713 B1
(45) Date of Patent: Jul. 22, 2014

(54) FIXTURE FOR ALIGNING AUTO-FOCUS LENS ASSEMBLY TO CAMERA SENSOR

(71) Applicant: Automation Engineering, Inc., Wilmington, MA (US)

(72) Inventor: Dan Tamasanis, Andover, MA (US)

(73) Assignee: Automation Engineering, Inc., Wilmington, MA (US)

( * ) Notice: Subject to any disclaimer, the term of this patent is extended or adjusted under 35 U.S.C. 154(b) by 0 days.

(21) Appl. No.: 13/829,732

(22) Filed: Mar. 14, 2013

(51) Int. Cl.
*H04N 5/225* (2006.01)

(52) U.S. Cl.
USPC ....... 348/207.99; 348/340; 348/375; 348/190

(58) Field of Classification Search
CPC ............... H04N 5/225; H04N 5/2259; H04N 5/2251–5/2254; H04N 5/2257
USPC ..................... 348/207.99, 340, 373–375, 345, 348/187–190
See application file for complete search history.

(56) References Cited

U.S. PATENT DOCUMENTS

| | | | | |
|---|---|---|---|---|
| 6,117,193 | A * | 9/2000 | Glenn ........................... | 29/25.01 |
| 8,063,975 | B2 | 11/2011 | Butterfield et al. ............ | 348/340 |
| 2005/0007485 | A1 | 1/2005 | Vook et al. ..................... | 348/345 |
| 2005/0162517 | A1* | 7/2005 | Fujihara et al. ............... | 348/187 |
| 2010/0103308 | A1* | 4/2010 | Butterfield et al. ............ | 348/340 |
| 2012/0019940 | A1 | 1/2012 | Lu et al. ......................... | 359/819 |
| 2012/0307089 | A1* | 12/2012 | Rukes ...................... | 348/208.99 |
| 2013/0047396 | A1 | 2/2013 | Au et al. ..................... | 29/407.09 |

FOREIGN PATENT DOCUMENTS

| | | | | |
|---|---|---|---|---|
| GB | 2420239 | | 5/2006 | ............... G02B 6/30 |
| WO | WO 96/07118 | | 3/1996 | ............. G02B 27/62 |

OTHER PUBLICATIONS

Shakespeare, "Optical Alignment in Optoelectronic Components", International Microelectronics and Packaging Society, Advancing Microelectronics, vol. 29, No. 1, Jan./Feb. 2002, 9 pages.
"Automation speeds precision products and rapid model changes", A discussion with Andre By of Automation Engineering Inc., Vision Systems Design, vol. 9, Issue 7, Jul. 1, 2004, 3 pages.
Roe et al., "Vision system assists camera-module alignment", Vision Systems Design, vol. 12, Issue 4, Apr. 1, 2007, 6 pages.
"Photonics Module Align Assembly & Test Flexible Automation Platform Cuts Time to Market", Automation Engineering Incorporated, http://www.aeiboston.com/pr012110.htm, Jan. 21, 2010, 1 page.
"Camera Module Alignment Assembly & Test Automation Cuts Time to Market for Ultra-Small Format Mobile Phone Cameras", Automation Engineering Incorporated, Feb. 11, 2010, 1 page.
"1/2.5-Inch 5Mp CMOS Digital Image Sensor", Aptina Imaging, Mar. 22, 2011, pp. 1-60.

(Continued)

Primary Examiner — Tuan Ho
Assistant Examiner — Zhenzhen Wu
(74) Attorney, Agent, or Firm — Sunstein Kann Murphy & Timbers LLP

(57) ABSTRACT

Methods and apparatus actively align a lens to a digital camera sensor. The lens includes a "floating" optical element. One or more test probes are temporarily electrically connected to electrical contacts, such as traces on a flexible printed circuit, of the lens. Motor control signals are injected via the test probes and the electrical contacts, so as to move the floating optical element to a predetermined position and maintain that position during the active alignment process.

22 Claims, 10 Drawing Sheets

(56) References Cited

OTHER PUBLICATIONS

"Aligning Optics", Vision Systems Design, vol. 16, Issue 4, Apr. 1, 2011, 7 pages.

"AEi Develops Modular Design for Camera Module Alignment Assembly & Test Automation Platform", Automation Engineering Incorporated, http://www.aeiboston.com/pr101811.htm, Oct. 4, 2011, 1 page.

"Interpolation", Wikipedia, Mar. 26, 2012, 6 pages.

"Adhesive Attach of Camera Module Lenses", http://www.kasalis.com/adhesive_attach.html, Kasalis 2012, no later than Aug. 30, 2012, 1 page.

"Active Alignment of Camera Module Components in Six Degrees of Freedom", http://www.kasalis.com/active_alignment.html, Kasalis, no later than Aug. 30, 2012, 2 pages.

International Searching Authority, International Search Report—International Application No. PCT/US2013/036355, dated Jul. 25, 2013, together with the Written Opinion of the International Searching Authority, 10 pages.

\* cited by examiner

FIXTURE FOR ALIGNING AUTO-FOCUS LENS ASSEMBLY TO CAMERA SENSOR

TECHNICAL FIELD

The present invention relates to automatic robotic alignment of optical components during manufacture or testing and, more particularly, to apparatus and methods for fixturing an automatic-focus lens assembly while robotically aligning the lens assembly to a digital camera sensor.

BACKGROUND ART

Robots are used in many precision-manufacturing processes. For example, robots are used to precisely align lenses before digital camera sensors, such as in the manufacture of cell phones and backup cameras for automobiles. In other examples, robots align ends of optical fibers before lasers or light sensors in the manufacture of telecommunication and computer network equipment. Many of the lenses are quite small, on the order of several millimeters in diameter, and must, therefore, be positioned with high precision, often on the order of about ±25 μm, relative to the sensors or lasers.

To keep costs down, less-than-precise methods are often used to manufacture optical elements for the lenses and to mount the optical elements in lens housings. Consequently, the optical elements and lenses are often not uniform, from piece to piece. That is, dimensions and symmetries of the components often vary from lens to lens, resulting in variations in focal length and orientation of the optical axes of the lenses.

To compensate for such variations, several known methods are used to custom align each lens to its corresponding image sensor. One method involves mounting a finely threaded bracket to the sensor and mounting a group of one or more optical elements in a complementarily threaded barrel. The distance between the optical elements and the sensor can then be adjusted as the lens barrel is threaded into the bracket. Once the optical elements are disposed a desired distance from the sensor, the barrel may be fixed, relative to the bracket, to prevent further rotation. Unfortunately, this method allows adjustment of only the distance between the optical elements and the sensor along the z axis. Thus, this is method is referred to as aligning with only one degree of freedom. Such an alignment methodology cannot compensate for asymmetries in the optical elements or imperfect alignment of the optical elements within the barrel.

A more sophisticated method, developed by Automation Engineering, Inc. ("AEi"), Wilmington, Mass., involves attaching the lens barrel, which in this case does not require threads, to the image sensor or its substrate by an adhesive. The position of the lens barrel, relative to the image sensor, is adjusted in free space by a robot, which then holds the lens barrel in position until the adhesive cures sufficiently to prevent objectionable creep once the robot releases the lens barrel. Using this method, the position of the lens may be adjusted along all three axes (x, y and z), and tip (rotation about the x axis) and tilt (rotation about the y axis) of the lens may be adjusted, to achieve a lens position and orientation, relative to the sensor, that compensates for imperfections in the optical elements and in the way the optical elements are mounted within the barrel. This method is referred to as aligning about five degrees of freedom.

A refinement of this method, also develop by Automation Engineering, Inc., involves the robot rotating the lens barrel about the optical axis of the lens or about the z axis to optimize image quality, to compensate for angular lens asymmetries. Note that alignment about the optical or z axis is generally not possible with the threaded barrel alignment method, because it is highly unlikely to simultaneously achieve both a desired lens-to-sensor spacing (by threading the barrel in or out) and a desired lens rotation angle (by rotating the barrel). Adding this refinement to the 5-degree of freedom alignment method provides a 6-degree of freedom alignment.

"Passive alignment" involves aligning components to each other based on design specifications of the components, using precision mechanical fixtures, tooling, physical characteristics (fiducials) on surfaces of components and the like. For example, a design focal length of a lens may be used to position the lens, relative to a sensor. However, passive alignment assumes components perfectly conform to their theoretical design specifications. This, of course, does not occur with real-world products. Thus, passive alignment methods are typically unable to compensate for piece-to-piece variations in components, such as lenses, unless each piece is individually tested to ascertain its actual specifications.

In contrast, "active alignment" involves measuring one or more key performance attributes of a combination of components during manufacture and using the measured attributes in a feedback loop to control the manufacture. For example, a visual target, such as a test pattern, may be disposed within a viewing angle of a lens-and-image-sensor combination while a robot steps the lens through a series of discrete positions (ex., along the x, y and z axes) and orientations (ex., tips, tilts and rotations about the z axis). A computer analyzes image data from the sensor at each step and, based on this analysis, the computer controls the robot to position and orient the lens for optimum image quality. The lens is then fixed in position, relative to the sensor, such as by an adhesive. Active alignment is, therefore, able to compensate for piece-to-piece variations in components.

In some cases, the optical element(s) are not fixedly mounted within a barrel. For example, the optical element(s) may be loosely suspended within the barrel, such as by a spring, and driven by one or more voice coil motors (VCM) or other electromechanical positioning components that facilitate automatically focusing the optical elements or moving the optical elements to compensate for lens shake, once barrel has been attached to the sensor or its substrate. Such movable optical elements are said to "float" within their respective barrels. However, while being positioned and aligned, as described above, these floating optical elements frustrate the alignment procedure.

SUMMARY OF EMBODIMENTS

An embodiment of the present invention provides a method for aligning a lens to a digital camera sensor. The lens includes a housing, a floating optical element disposed within the housing, a plurality of electrical contact points and a motor disposed within the housing. The motor is electrically coupled to at least one of the plurality of electrical contact points. The motor is configured to move the floating optical element with respect to the housing in response to a signal on the at least one of the plurality of electrical contact points. According to the method, the following operations are performed automatically. The housing is gripped with a robotic jaw. At least one of the plurality of electrical contact points is robotically touched with a test probe, thereby making a temporary electrical connection between the test probe and the at least one of the plurality of electrical contact points. A control signal is generated. The control signal is configured to drive the motor, such that the motor moves the floating optical element to a predetermined position. The control signal is supplied to the test probe. Using the robotic jaw, the housing is scanned along a trajectory, relative to a camera sensor. Image signals are received from the camera sensor. A plurality of time spaced-apart alignment data items are generated from the image signals. Each alignment data item of the plurality of time spaced-apart alignment data items is indicative of a degree of alignment between the lens and the camera sensor, An alignment position is estimated, based on the plurality of time spaced-apart alignment data items. The robotic jaw is caused to move the housing to the alignment position. The housing is fixed in place, relative to the camera sensor.

The plurality of electrical contact points may be disposed on a flexible printed circuit comprising a plurality of conductive traces and extending from within the housing to a point external to the housing. Making the temporary electrical connection between the test probe and the at least one of the plurality of electrical contact points may include robotically touching at least one of the plurality of conductive traces with the test probe, thereby making a temporary electrical connection between the test probe and the at least one of the plurality of conductive traces.

The lens further may include a position sensor disposed within the housing. The position sensor may be configured to generate a signal indicative of a position of the floating optical element. The position sensor may be electronically coupled to at least one of the plurality of electrical contact points to send the signal indicative of the position of the floating optical element on the at least one of the plurality of electrical contact points. Generating the control signal may include generating the control signal based at least in part on the signal indicative of the position of the floating optical element.

The at least one of the plurality of electrical contact points to which the position sensor is coupled may be different than the at least one of the plurality of electrical contact points to which the motor is coupled. The method may further robotically touching the second at least one of the plurality of electrical contact points with a second test probe, thereby making a temporary electrical connection between the second test probe and the second at least one of the plurality of electrical contact points. In addition, the signal indicative of the position of the floating optical element may be received via the second test probe.

Robotically touching the at least one of the plurality of electrical contact points with the test probe may include translating the test probe toward the at least one of the plurality of electrical contact points.

Translating the test probe toward the at least one of the plurality of electrical contact points may include translating the test probe along an axis perpendicular to an optical axis of the lens.

The electrical contact points may include a flexible printed circuit. The temporary electrical connection between the test probe and the at least one of the plurality of electrical contact points may be made on one side of the flexible printed circuit. The lens may include a structural member disposed on another side of the flexible printed circuit. Robotically touching the at least one of the plurality of electrical contact points with the test probe may include forcing the flexible printed circuit against the structural member.

Robotically touching the at least one of the plurality of electrical contact points with the test probe may include causing an end of the test probe to contact the at least one of the plurality of electrical contact points within a perimeter of the housing.

Robotically touching the at least one of the plurality of electrical contact points with the test probe may include causing an end of the test probe to contact the at least one of the plurality of electrical contact points within about 5 mm of the housing.

The electrical contact points may include a flexible printed circuit. The method may further include applying at least a partial vacuum to attract the flexible printed circuit toward the test probe.

A second control signal may be generated. The second control signal may be configured to drive the motor, such that the motor moves the floating optical element to a second predetermined position. The second control signal may be supplied to the test probe. Operation of the lens may be measured while the floating optical element is at the second predetermined position.

Another embodiment of the present invention provides a robot for aligning a lens to a digital camera sensor. The lens includes a housing, a floating optical element disposed within the housing, a plurality of electrical contact points and a motor disposed within the housing. The motor is electrically coupled to at least one of the plurality of electrical contact points. The motor is configured to move the floating optical element with respect to the housing in response to a signal on the at least one of the plurality of electrical contact points.

The robot includes a robotic jaw configured to grip the housing. The robot also includes a test probe configured to robotically touch at least one of the plurality of electrical contact points, thereby making a temporary electrical connection between the test probe and the at least one of the plurality of electrical contact points. The robot also includes a processor configured to generate a control signal configured to drive the motor, such that the motor moves the floating optical element to a predetermined position. The processor is also configured to supply the control signal to the test probe and use the robotic jaw to scan the housing along a trajectory, relative to the camera sensor. The processor is also configured to receive image signals from the camera sensor. The processor is also configured to generate a plurality of time spaced-apart alignment data items from the image signals. Each alignment data item of the plurality of time spaced-apart alignment data items is indicative of a degree of alignment between the lens and the camera sensor. The processor is also configured to estimate an alignment position, based on the plurality of time spaced-apart alignment data items. The processor is also configured to cause the robotic jaw to move the housing to the alignment position. The processor is also configured to fix the housing in place, relative to the camera sensor.

The plurality of electrical contact points may be disposed on a flexible printed circuit that includes a plurality of conductive traces. The flexible printed circuit may extend from within the housing to a point external to the housing. The test probe may be configured to make the temporary electrical connection between the test probe and the at least one of the plurality of electrical contact points by robotically touching at least one of the plurality of conductive traces with the test probe, thereby making a temporary electrical connection between the test probe and the at least one of the plurality of conductive traces.

The lens may also include a position sensor disposed within the housing. The position sensor may be configured to generate a signal indicative of a position of the floating optical element. The position sensor may be coupled to at least one of the plurality of electrical contact points to send the signal indicative of the position of the floating optical element on the at least one of the plurality of electrical contact points. The processor may be configured to generate the control signal based at least in part on the signal indicative of the position of the floating optical element.

The position sensor may be coupled to a second at least one of the plurality of electrical contact points, different than the at least one of the plurality of electrical contact points to which the motor is coupled. The robot may further include a second test probe. The second test probe may be configured to robotically touch the second at least one of the plurality of electrical contact points, thereby making a temporary electrical connection between the second test probe and the second at least one of the plurality of electrical contact points. The processor may be configured to receive, via the second test probe, the signal indicative of the position of the floating optical element.

The test probe may be configured to translate toward the at least one of the plurality of electrical contact points.

The test probe may be configured to translate along an axis perpendicular to an optical axis of the lens.

The electrical contact points may include a flexible printed circuit. The temporary electrical connection between the test probe and the at least one of the plurality of electrical contact points may be made on one side of the flexible printed circuit. The lens may include a structural member disposed on another side of the flexible printed circuit. The processor and the test probe may be configured to force the flexible printed circuit against the structural member.

The processor and the test probe may be configured to cause an end of the test probe to contact the at least one of the plurality of electrical contact points within a perimeter of the housing.

The processor and the test probe may be configured to cause an end of the test probe to contact the at least one of the plurality of electrical contact points within about 5 mm of the housing.

The electrical contact points may include a flexible printed circuit. The robot may further include a vacuum nozzle proximate the test probe. The vacuum nozzle may be oriented toward the flexible printed circuit. The vacuum nozzle may be configured to apply at least a partial vacuum to attract the flexible printed circuit toward the test probe.

The processor may be configured to generate a second control signal. The second control signal may be configured to drive the motor, such that the motor moves the floating optical element to a second predetermined position. The processor may be configured to supply the second control signal to the test probe and measure operation of the lens while the floating optical element is at the second predetermined position.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
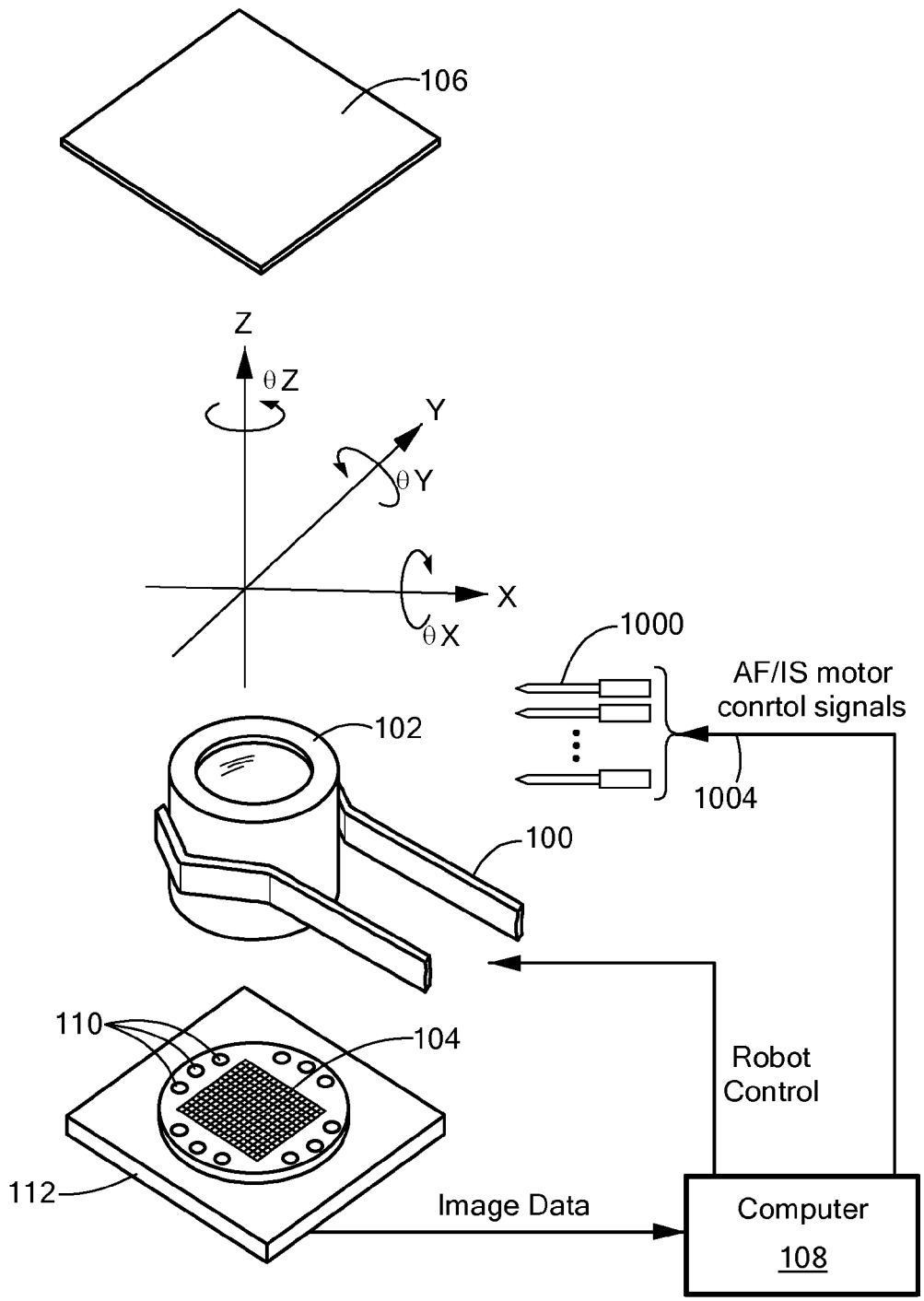
FIG. 1 is a perspective schematic illustration of a robotic active alignment system, according to an embodiment of the present invention.

In accordance with embodiments of the present invention, methods and apparatus are disclosed for actively aligning a lens to a digital camera sensor, including temporarily electrically connecting one or more test probes to electrical contacts, such as traces on a flexible printed circuit, of the lens and injecting motor control signals via the test probes and electrical contacts, so as to move a floating optical element within the lens to a predetermined position and maintaining that position during the active alignment process.

As alluded to above, an established approach to align objects during assembly or test operations involves use of active feedback or measurements that correlate directly to a degree (quality) of alignment between the objects. For example, a lens or other optical object can be optimally aligned to a light emitting diode to produce a highest focus beam by using a beam profiling sensor to detect when beam power density from the diode through the lens is highest. In another example, schematically illustrated in FIG. 1, an automated robot (represented by a gripper 100) is used to optimally align a lens 102 before a digital camera sensor 104 during assembly of the two objects 102 and 104 by evaluating focus sharpness of images taken by the sensor 104 while it is powered up and pointed towards an alignment target 106, while positioning the lens 102 at successive locations along the x, y and/or z axes and successive orientations about the x, y and/or z axes, with respect to the sensor 104. Tip (about the x axis), tilt (about the y axis) and rotation (about the z axis) are indicated by angles θx, θy and θz, respectively.

Figure 2:
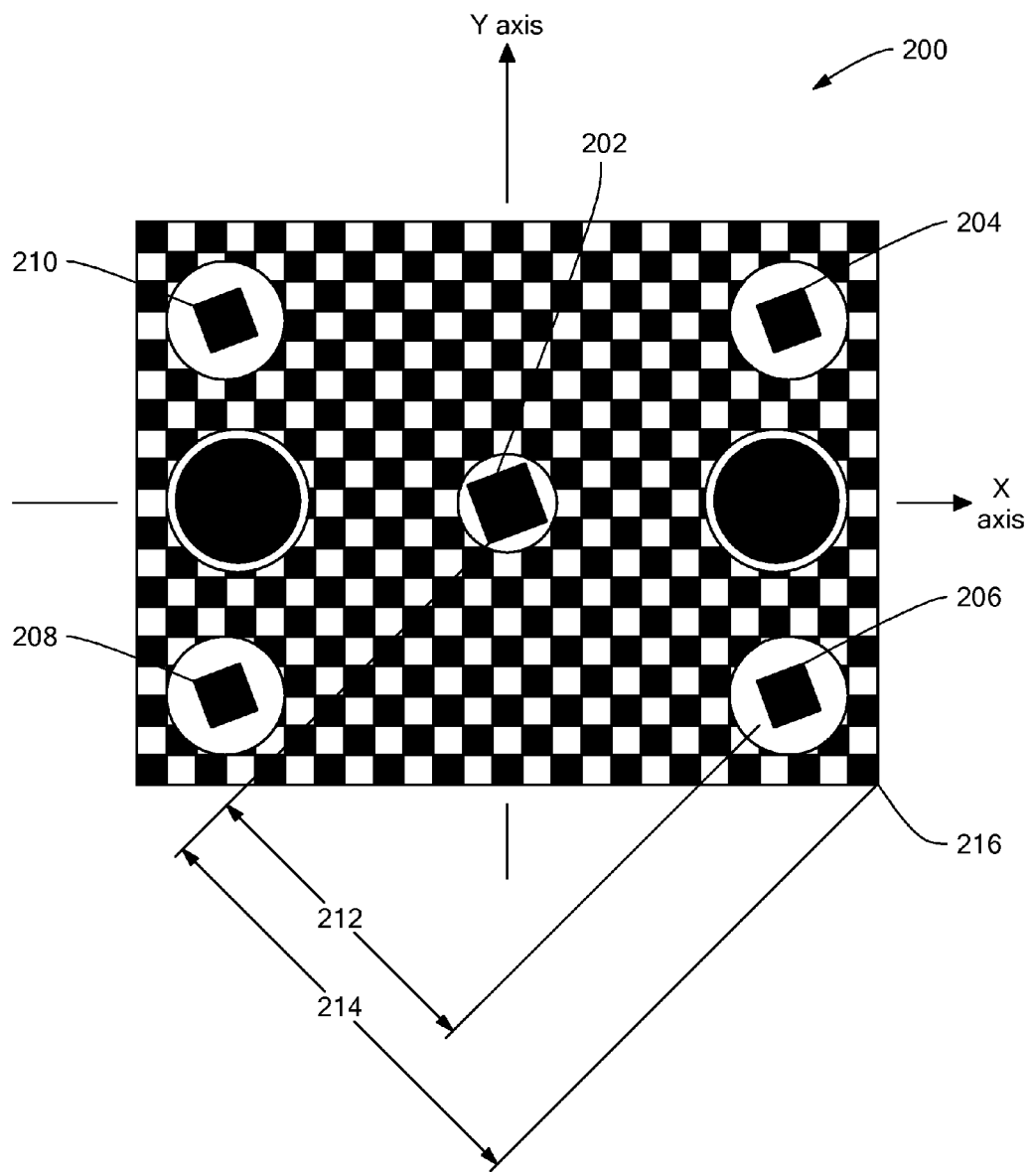
FIG. 2 is an illustration of an alignment target of FIG. 1.

FIG. 2 illustrates an exemplary alignment target 200. The target 200 has high-contrast features at its center 202 and corners 204, 206, 208 and 210, as seen by the sensor 104. In the exemplary target shown in FIG. 2, each high-contrast feature includes a slightly rotated black square on a white background. Thus, the position and orientation of the lens 102, with respect to the sensor 104, that have best image focus quality, as imaged by the sensor 104, will be where the images have highest observed image intensity gradient or contrast across the high contrast variations distributed spatially across the target 200. In other words, as the lens 102 is stepped through its various positions and orientations, when the highest contrast or intensity gradient is detected in the image, the lens 102 is positioned to provide best focus.

Figure 3:
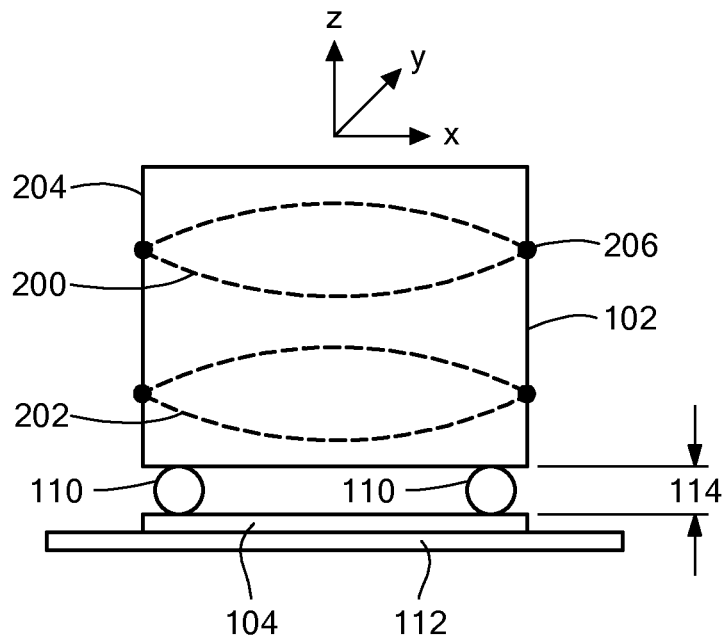
FIG. 3 is a cross-sectional view of a portion of the system of FIG. 1.

As shown schematically in FIG. 3, the lens 102 includes one or more optical elements, exemplified by optical elements 200 and 202, within a barrel 204. The robot 100 grips the barrel 204, and the alignment procedure summarized above assumes the optical elements 200-202 are positioned and oriented along with the barrel 204. In most lenses 102, the optical elements 200-202 are fixed within the barrel 204, such as by an adhesive, exemplified by adhesive 206, or by pairs of threaded mating mounts (not shown) that sandwich an optical element therebetween. Thus, the position and orientation of the barrel 204 determines the position and orientation of the optical elements 200-202.

However, some lenses include electromechanical automatic focus ("AF") or image stabilization ("IS") mechanisms that move the optical elements 200-202 within the barrel 204. An automatic focus mechanism may move the optical elements 200-202 (or a subset of them) along the z axis of the barrel 204. An image stabilization mechanism may move the optical elements 200-202 (or a subset of them) along the x and y axes of the barrel 204. The mechanisms for moving the optical elements 200-202 are typically implemented with electromagnets, such as voice coil motors (VCMs) or other suitable (typically linear) motors.

Optical elements that can be moved by such mechanisms are said to "float" within the barrel 204. (As used herein, "float" means attached to a motor and movable within a barrel by action of the motor.) When a completed camera system is used, electrical signals drive the AF or IS motors. However, during assembly, the relatively free-floating optical elements pose problems for the positioning and alignment process summarized above. Embodiments of the present invention solve these problems by temporarily electrically connecting to the AF or IS motors and providing them with signals that cause the motors to hold the optical elements 200-202 still, with respect to the barrel 204.

Figure 8:
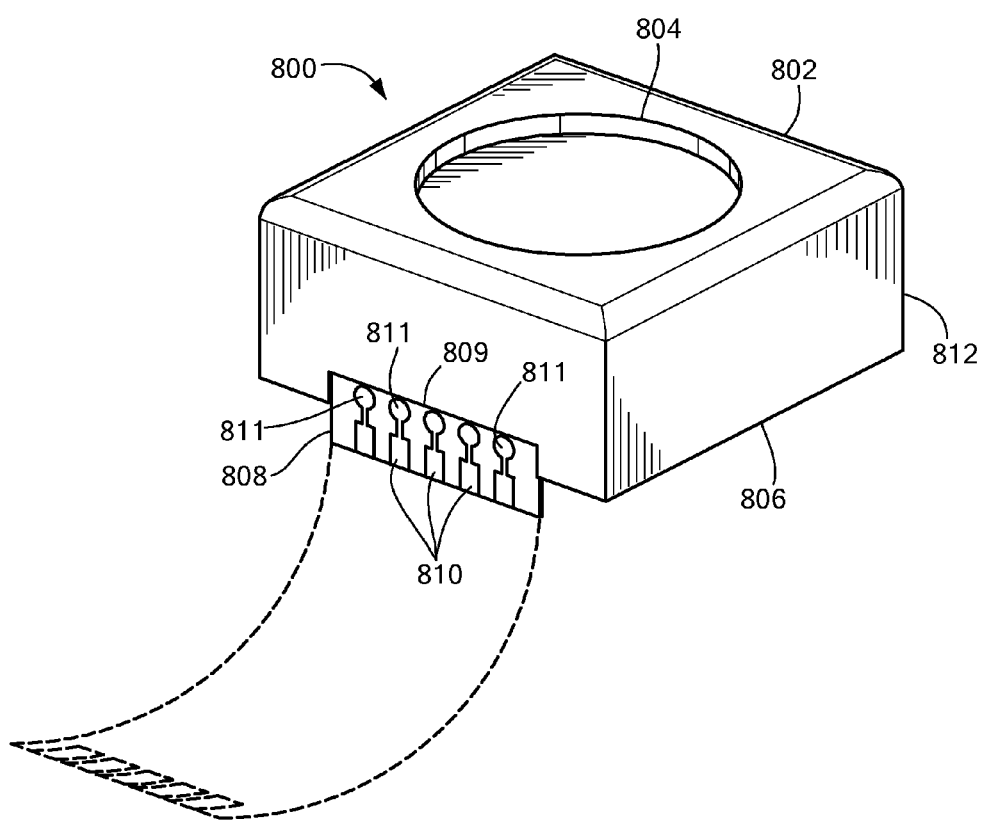
FIG. 8 is a perspective illustration of a lens that includes a floating optical element, according to the prior art.

FIG. 8 is a perspective illustration of a lens 800 that includes a floating optical element (not visible). The lens 800 includes a housing 802 that defines an aperture 804, through which light may enter the lens 800. (The housing 802 in FIG. 8 corresponds to the lens 102 in FIG. 1) Light exits the lens 800 via a second aperture (not visible) on the bottom 806 of the lens 800. The bottom 806 of the lens 800 is to be attached to the image sensor 104 (FIG. 1) or its substrate 112. At least one automatic focus, image stabilization or other motor (not visible) within the housing 802 causes the floating optical element to move, with respect to the housing 802, in response to a suitable signal. Each motor may have an associated position sensor (not visible) within the housing 802 that provides a signal indicating a position of an optical element along or about an axis.

A printed circuit 808 has traces electrically connected to the motor(s) and to the position sensor(s). In many cases, the printed circuit 808 is a flexible printed circuit (FPC). However, in other cases, the printed circuit 808 may be rigid. In yet other cases, electrical contact points may be disposed on, or supported by, one or more structures other than a printed circuit board. For example, the electrical contact points may be solder pins on the motors. All the electrical contact points need not be on a single structure. For simplicity of explanation, the following description refers to a flexible printed circuit. However, principles described herein apply to other structures that have locations at which electrical contact can be made.

The flexible printed circuit 808 extends from inside the housing 802 to outside the housing 802 via a rectangular cutout section 809 of the housing 802. After the lens 800 is attached to an image sensor (such as the image sensor 104 shown in FIG. 1) or its substrate (such as the substrate 112 shown in FIG. 1), the flexible printed circuit 808 may be used to electrically connect the motor(s) and position sensor(s) to control circuits (not shown), such as control circuits on the substrate. The motor(s) may be connected to different traces than the position sensors or to the same traces on the position sensors. For example, each motor and each sensor may be connected to its own trace, or any combination of the motors and/or position sensors may be multiplexed onto a single trace or set of traces, such as via an I2C bus. The flexible printed circuit 808 may include electrical contacts (exemplified by contacts 810) configured to mate with a suitable electrical connector (not shown), such as on the substrate. The flexible printed circuit 808 is long enough to reach the connector. For simplicity, the flexible printed circuit 808 shown in FIG. 8 is relatively short, although a possible longer flexible printed circuit 808 is shown in dashed line. The traces on the flexible printed circuit 808 may be electrically insulated. However, at least a small portion of each trace near the housing 802 should remain uninsulated. Exemplary uninsulated portions of the traces are indicated at 811.

Some such lenses 800 include more than one flexible printed circuit coupled to the motor(s), position sensor(s) and/or to other circuits (not visible) inside the housing 802. For example, the lens 800 may have a second flexible printed circuit (not visible) extending from a back side 812 of the housing 802.

Figure 9:
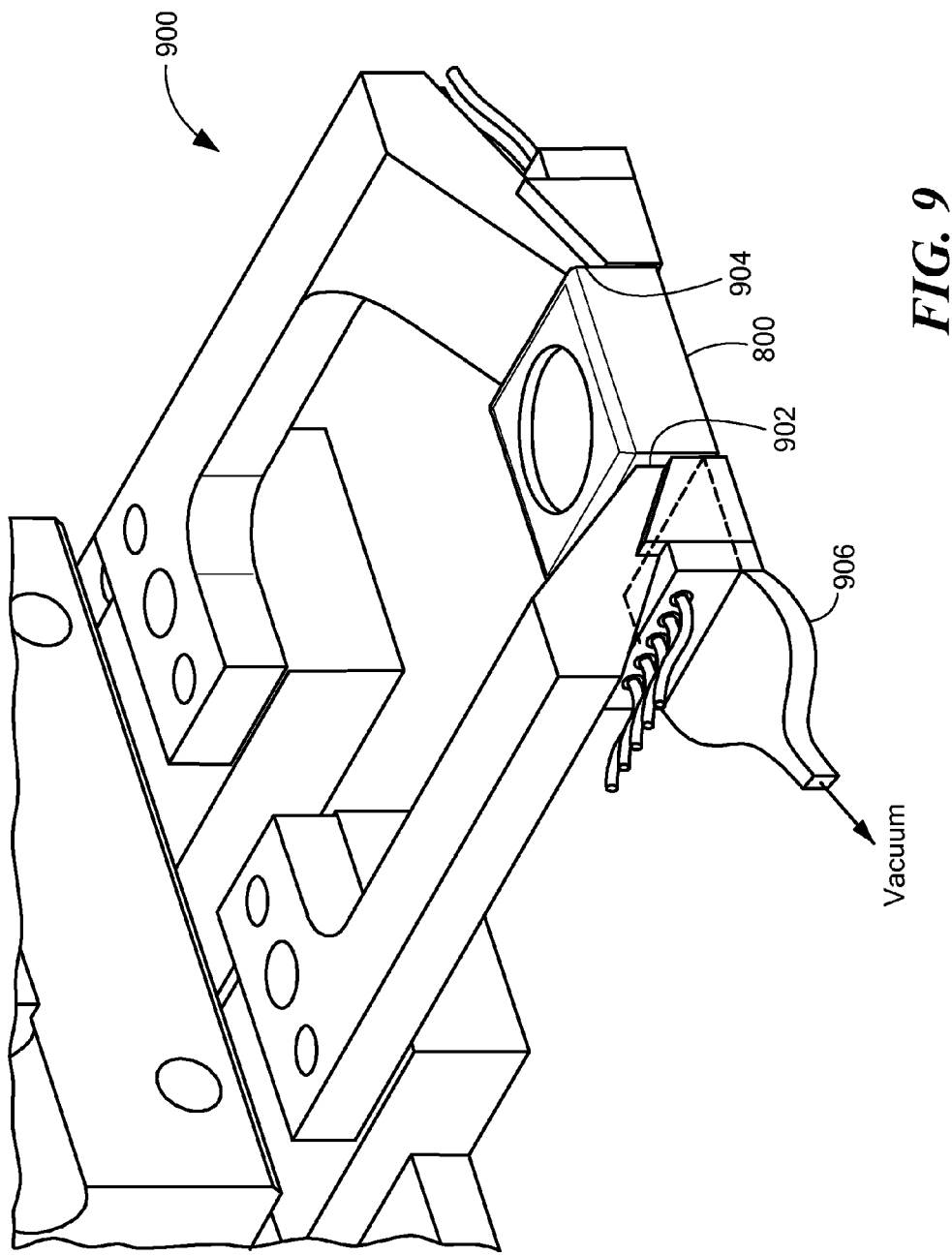
FIG. 9 is a perspective illustration of a robotic gripper configured to grip the lens of FIG. 8, according to an embodiment of the present invention.

FIG. 9 is a perspective illustration of a robotic gripper 900 configured to grip the lens housing 800 during the positioning and alignment procedure described herein. The gripper 900 corresponds to the gripper 100 shown in FIG. 1. The gripper 900 includes two articulated jaws 902 and 904, although any suitable jaw may be used. Exemplary alternative jaws include 3-part jaws and hook-shaped jaws.

Figure 10:
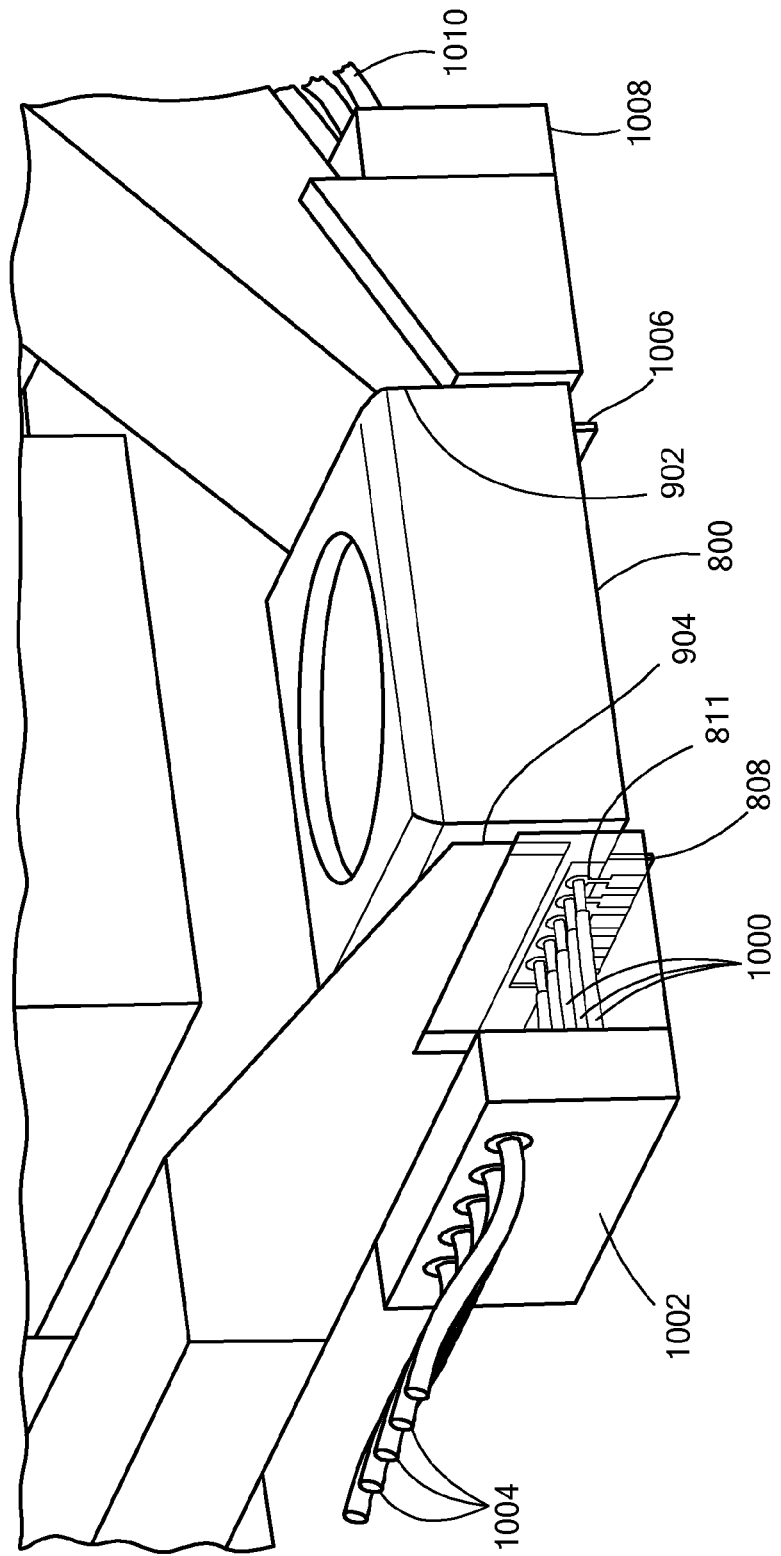
FIG. 10 is a perspective close-up illustration of jaws of the robotic gripper of FIG. 9, as well as of a set of spring-loaded test probes, according to an embodiment of the present invention.

FIG. 10 is a perspective close-up illustration of the jaws 902-904, as well as of a set of spring-loaded test probes ("pogo pins") 1000 extending from an insulating block 1002, such as a printed circuit board, generally horizontally toward the gripped housing 800. Optionally, the test probes 1000 may be mounted on a separate electrically insulated block (not show), which mates with the block or printed circuit board 1000. The block 1002 may be fixed to the jaw 904 for movement therewith. Optionally or alternatively, the block 1002 may be coupled to a separate actuator (not shown), such as a linear motor. In either case, the block 1002 translates horizontally as, or after, the housing 800 is gripped by the jaws 902 and 904. This horizontal translation is typically, but not necessarily, perpendicular to the optical axis of the lens. In other embodiments, the block 1002 may translate at an angle other than perpendicular to the optical axis.

The test probes 1000 are positioned and oriented such that an uninsulated portion (such as portion 811) of each trace on the flexible printed circuit 808 that is connected to a motor, and optionally an uninsulated portion of each trace that is connected to the motor's associated position sensor, is contacted by one of the test probes 1000. The block 1002 translates a distance sufficient to force the test probes 1000 into mechanical and temporary electrical contact with the respective traces on the flexible printed circuit 808. "Temporary electrical contact" here means the electrical contact is maintained as long as the test probe is in mechanical contact with the uninsulated portion of the trace. For example, a soldered connection or a connection formed by friction mating a male and female connector is not a temporary electrical contact.

The block 1002 may include solderable connections or a suitable disconnectable plug or socket, to which leads 1004 may be electrically connected. The leads 1004 interconnect the test probes 1000 with the computer 108 (FIG. 1) to enable the computer 108 to drive the motors with motor control signals and optionally to sense the positions of the optical element by analyzing the position signals. When the housing 802 is to be released, the block 1002 retracts, thereby retracting the test probes 1000 from contact with the flexible printed circuit 808. If additional motor and/or control signal traces are present on another flexible printed circuit 1006, an additional block 1008, another set of test probes (not visible) and another set of leads 1010 may be used.

Returning to FIG. 8, the flexible printed circuit 808 may be sufficiently rigid to withstand the force of the set of test probes 1000 without deflecting objectionably or sufficiently to negatively impact integrity of the temporary electrical connections between the test probes 1000 and the traces on the flexible printed circuit 808. However, if the flexible printed circuit 808 is not sufficiently rigid, a portion of the housing 802, such as a structural member (not visible), within the housing 802 should be provided behind the flexible printed circuit 808, i.e., on a side of the flexible printed circuit 808 opposite the side contacted by the test probes 1000, to provide a backstop, against which the test probes 1000 may push the flexible printed circuit 808. Generally, but not necessarily, the ends of the test probes 1000 make contact with the traces on the flexible printed circuit 808 within the perimeter of the housing 800 or within a short distance, such as about 5 mm, of the housing 800.

Optionally or alternatively, a nozzle 906 (FIG. 9) and a suitable vacuum system (not shown) may be used to draw the flexible printed circuit 808 toward the set of test probes 1000.

The computer 108 (FIG. 1) generates control signals to drive each motor to position the optical element(s) at desired position(s) within the housing 802 and hold the optical element(s) in the desired position(s). For each motor-sensor pair, the computer 108 may operate a feedback loop, using the position information provided by the position sensor to adjust the motor control signal. Each optical element may be positioned at one extreme of its motor-driven travel within the housing 802, or at an intermediate position, such as at a mid-point, or any other point convenient or desirable for facilitating the lens 102 positioning and alignment procedure described herein.

Figure 11:
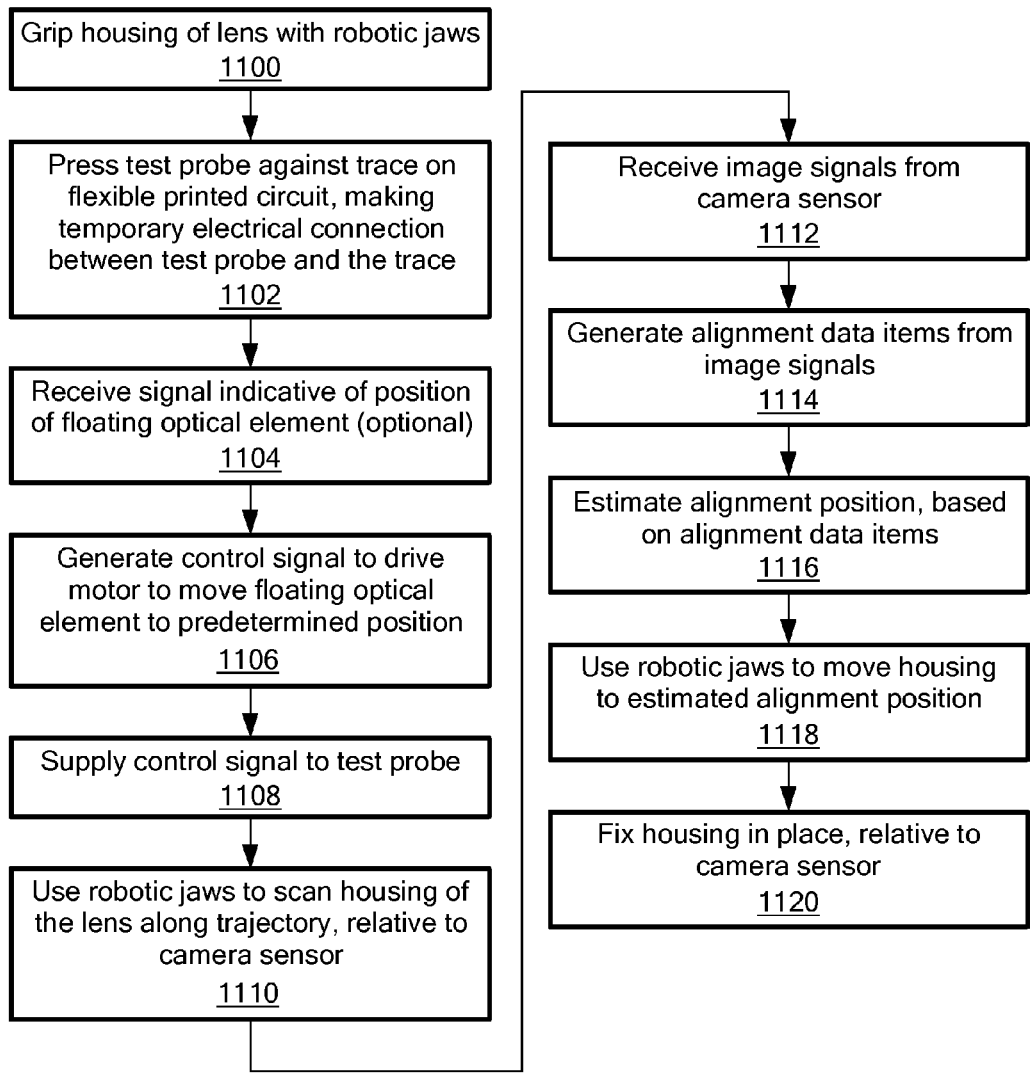
FIG. 11 is a flowchart schematically illustrating operations performed by an embodiment of the present invention.

FIG. 11 is a flowchart that schematically illustrates operations performed by an embodiment of the present invention to align a lens to a digital camera sensor. At 1100, a pair of robotic jaws grips a housing of the lens. At 1102, a first test probe is pressed against a trace on a flexible printed circuit, thereby touching the trace and making a temporary electrical connection between the first test probe and the trace. At 1104, optionally, a signal indicative of a position of a floating optical element within the lens is received. This may involve pressing a second test probe against a different trace on the flexible printed circuit and receiving the signal via the second test probe. At 1106, a control signal is generated to drive a motor in the lens to move the floating optical element to a predetermined position. The control signal may be generated based at least in part on the signal indicative of the position of the floating optical element. At 1108, the control signal is supplied to the first test probe.

At 1110, the robotic jaws are used to scan the housing of the lens along a trajectory, relative to the camera sensor. At 1112, image signals are received from the camera sensor. At 1114, a plurality of time spaced-apart alignment data items are generated from the image signals. Each alignment data item is indicative of a degree of alignment between the lens and the camera sensor. At 1116, an alignment position is estimated, based on the time spaced-apart alignment data items. The term "estimate" is used here, because the estimated alignment position may not be perfect. However, in some cases, the estimate may be perfect; nevertheless, it is referred to herein as an estimate. At 1118, the robotic jaws move the housing to the alignment position, and at 1120, the housing is fixed in place, relative to the camera sensor.

The positioning and alignment procedure, and equipment used therein, will now be described in more detail. Returning to FIG. 1, a bed of nails, spring-loaded test probes or another well-known in-circuit test fixture (not shown) is used to temporarily provide electrical power to the sensor 104 and to electrically connect the image sensor 104 to the computer 108 that controls the robot 100. Through the test fixture, the computer 108 receives image data from the image sensor 104 and evaluates image focus quality or another image attribute or set of attributes of the image. In some cases, separate (but interconnected) computers (not shown) control the robot 100 (including movement of the block 1002 (FIG. 10), analysis of the floating optical element position sensor signals and generation of the AF/IS motor control signals) and receive and evaluate the image data. The computer, or the portion of the computer 108, that receives and evaluates the image data is referred to herein as a "measurement system." The computer, or the portion of the computer 108, that controls the robot 100, optionally including encoders or other devices used by the computer to measure the location of the robot 100, are collectively referred to herein as a "motion control system."

Adhesive (here represented by adhesive dots 110, but alternatively an annular or other deposition of adhesive) is used to bond the lens 102 housing to the image sensor 104 or its substrate 112, as more clearly shown in FIG. 3, which is a cross-sectional view of the components of FIG. 1. In a typical example, such as a backup camera for a vehicle, the lens-to-sensor distance 114 is nominally about 75 μm, plus or minus about 25 μm. The adhesive is typically applied before the alignment process begins, although the adhesive can be applied afterward. If the adhesive is applied before the alignment process begins, sufficient adhesive is applied to accommodate extremes at which the lens 102 may be positioned and oriented, while still providing sufficient mechanical bonding between the lens 102 and the sensor 104 or substrate 112.

Once a position and an orientation that provide the best image focus quality are found, the robot 100 maintains the lens 102 in place while the adhesive at least partially cures. The computer 108 may cause the test probes 1000 to be withdrawn at this time or later. Most adhesives shrink while they cure. Thus, after determining the lens position and orientation that provide the best focus, some systems further adjust the lens position and orientation to compensate for expected adhesive shrinkage. Optionally, an ultraviolet beam and/or heat (not shown) may be applied to the adhesive to accelerate the curing.

In these and other alignment examples, finding the best alignment can be made methodical, repeatable and automatable by stepping the lens 102 through a series of discrete positions and orientations, possibly along multiple trajectories. The stepping typically begins with a lens-to-image sensor separation greater than expected to yield a well-focused image and continues to a lens-to-image sensor separation less than expected to yield a well-focused image. For example, for a lens 102 that is expected to produce a well-focused image at about 75 μm, the stepping may begin at a lens-to-image sensor separation of about 110 μm, and each step may involve moving the lens about 10 μm, until the lens 102 is within about 40 μm of the image sensor 104, or perhaps closer. At each step, a measurement is taken of optical power, beam density, acquired image sensor focus quality or another attribute directly related to the quality of the alignment. Typically, the lens 102 is made to approach the image sensor 104. However, movement of the lens 102 may be in either direction, i.e., toward or away from the image sensor 104.

Figure 4:
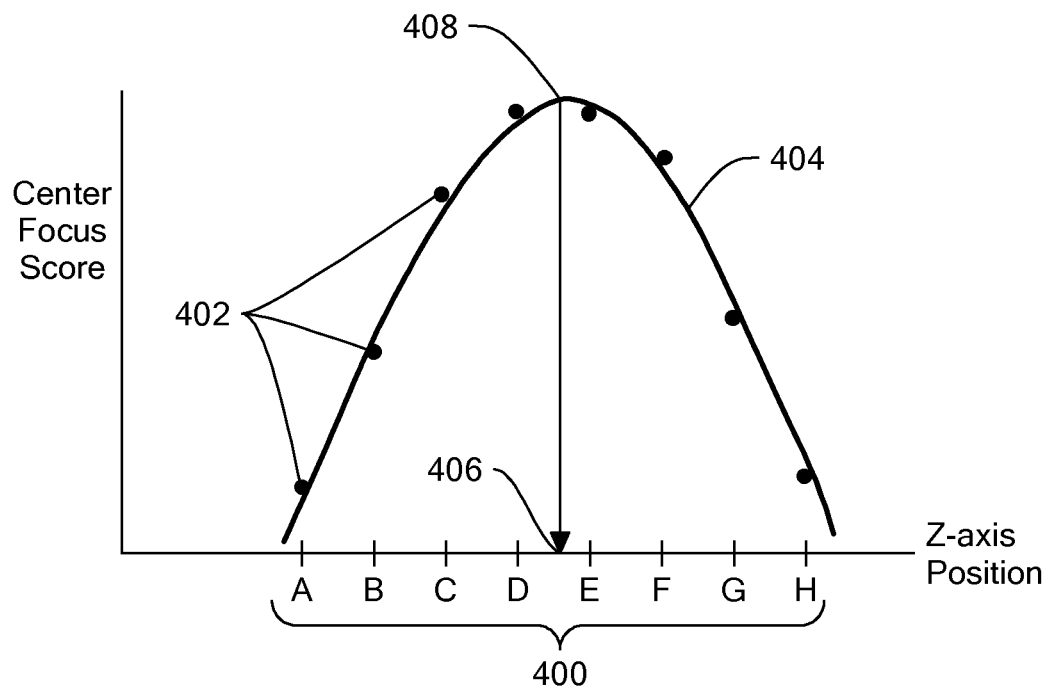
FIG. 4 is a hypothetical graph of center focus score, versus z-axis position of an optical element.

Assume the lens 102 is moved progressively along the z axis to each of several positions A, B, C, D, E, F, G and H represented by tick marks 400 in a graph in FIG. 4, and the computer 108 captures an image and calculates a focus score of the center 202 of the target 106 at each of these positions A-H. The focus score may be calculated based on a spatial rate of change or gradient across edge transitions from light to dark or dark to light in a region of interest captured by the camera under test.

Hypothetical center focus scores are indicated by points 402. The computer 108 then calculates a polynomial equation that best fits the points 402. Curve 404 represents a plot of a hypothetical best fit polynomial equation for the points 402. Thus, the curve 404 and the equation describe a relationship between beam or image focus quality and lens position. From the polynomial equation, the computer 108 calculates a z-axis location 406 for the lens 102 that should produce the best center focus score 408, i.e., at a peak in the curve 404. The peak 408 may represent a local maximum of the fitted equation. The computer 108 may then cause the robot to position the lens 102 at the determined best location 406 along the z axis and allow the adhesive to cure.

The process may be repeated (before the adhesive cures) for each of the other axes (x and y) and for orientations (rotations) about the x, y and z axes. More sophisticated systems may repeat the tests to improve accuracy. For example, each test may determine a location and/or an orientation that provides an improved focus score over the previous test, and each subsequent test may begin with the lens located and/or oriented according to results of the previous test, so as to iteratively find a position and orientation that provide a good focus score.

As noted, optical elements may not be perfectly mounted within the lens 102. For example, the optical elements may be tilted, with respect to their ideal orientations. Furthermore, the sensor 104 may not be perfectly perpendicular to, or centered on, the z axis. Consequently, the position 406 (FIG. 4) of the lens 102 along the z axis that produces the best center focus score 408 many not necessarily produce best focused corners 204, 206, 208 and 210. Thus, as the lens 102 is stepped along the z axis toward the image sensor 104, one of the corners 204, 206, 208 or 210 of the target 200 may come into best focus before (i.e., at a greater z-axis distance from the sensor 104 than) the center 202 of the target 200. Similarly, the other corners 204, 206, 208 and/or 210 may come into best focus at other locations of the lens 102 along the z axis.

Figure 5:
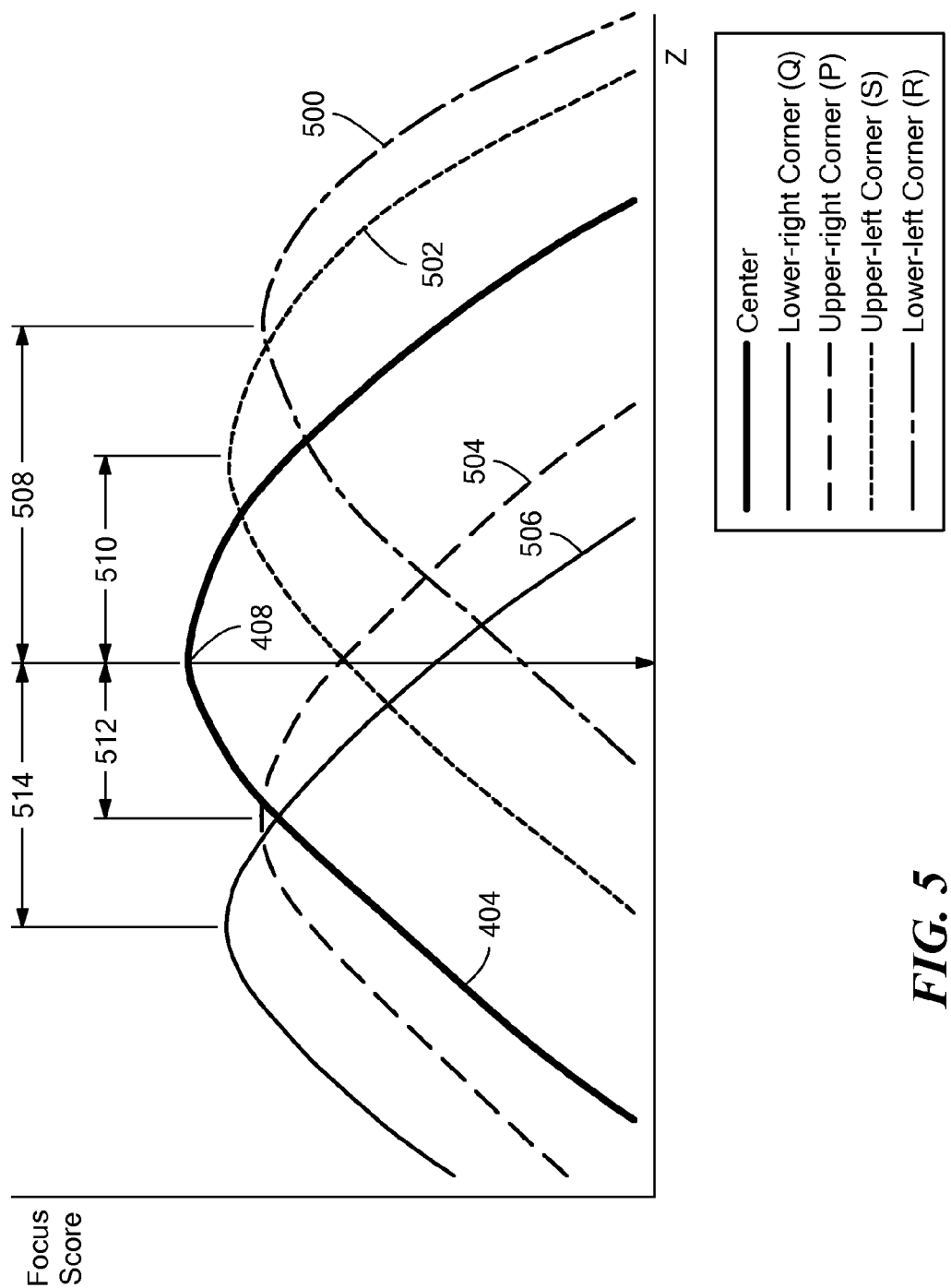
FIG. 5 is a hypothetical graph of center and four corner focus scores, versus z-axis position of an unaligned optical element.

As the robot 100 steps the lens 102 through the positions A-H (400, FIG. 4) along the z axis, the computer 108 analyzes portions of the sensor image data representing the corners 204, 206, 208 and 210 of the target 200 and fits polynomial curves for each of the four corners. FIG. 5 depicts a hypothetical set of curves 500, 502, 504 and 506 representing polynomial equation fits of focus scores for the four corners 204, 206, 208 and 210. In this hypothetical example, the lower-right corner 206, represented by focus score curve 506, is best focused at a smaller z-axis (lens-to-sensor) distance than the center 202 of the target 200 or any of the other three corners 204, 208 or 210. Similarly, the lower-left corner 208, represented by focus score curve 500, is best focused at a larger z-axis lens-to-sensor distance than the center 208 or any of the other three corners 204, 206 or 210. Note that the shapes and heights of the center and of the four corner focus score curves 408, 500, 502, 504 and 506 may not necessarily be identical, due to imperfections, such as asymmetries, in the lens 102.

From the polynomial equations corresponding to the curves 500, 502, 504 and 506, the computer 108 determines tip and tilt angles (θx and θy) for the lens 102 that optimize focus of the corners 204, 206, 208 and 210. A respective distance 508, 510, 512 and 514 between each peak in the corner focus score curves 500, 502, 504 and 506 and the peak of the center focus score curve 404 is proportional to an amount by which the respective portion of the lens 102 is tipped or tilted, relative to ideal, and, therefore, the amount of tip or tilt required to compensate for the lens imperfection. The amount of tip or tilt required also depends on the distance 212 between the center 202 of the target 200 and the high-contrast feature 204, 206, 208 or 210 used to calculate the focus score. The further the high-contrast feature 204, 206, 208 or 210 is from the center 202 of the target 200, the more tip or tilt is required to correct for a given displacement 508, 510, 512 or 514 of the peak in the focus score from the peak 408 in the center focus score.

Corner focus score curves (exemplified in this hypothetical case by curves 504 and 506) whose peaks are to the left of the center focus score curve 404 correspond to corners 204 and 206 (in this case upper-right and lower-right corners) that are in best focus when the lens 102 is closer to the image sensor 104 than when the center 202 of the target 200 is in best focus. Therefore, the lens 102 should be tipped and/or tilted, so as to increase the distances between the lens 102 and the portions of the image sensor 104 that image these corners 204 and 206.

Similarly, corner focus score curves (exemplified by curves 500 and 502) whose peaks are to the right of the center focus score curve 404 correspond to corners 208 and 210 (in this case upper-left and lower-left corners) that are in best focus when the lens 102 is further from the image sensor 104 than when the center 202 of the target 200 is in best focus. Therefore, the lens 102 should be tipped and/or tilted, so as to decrease the distances between the lens 102 and the portions of the image sensor 104 that image these corners 208 and 210.

Figure 6:
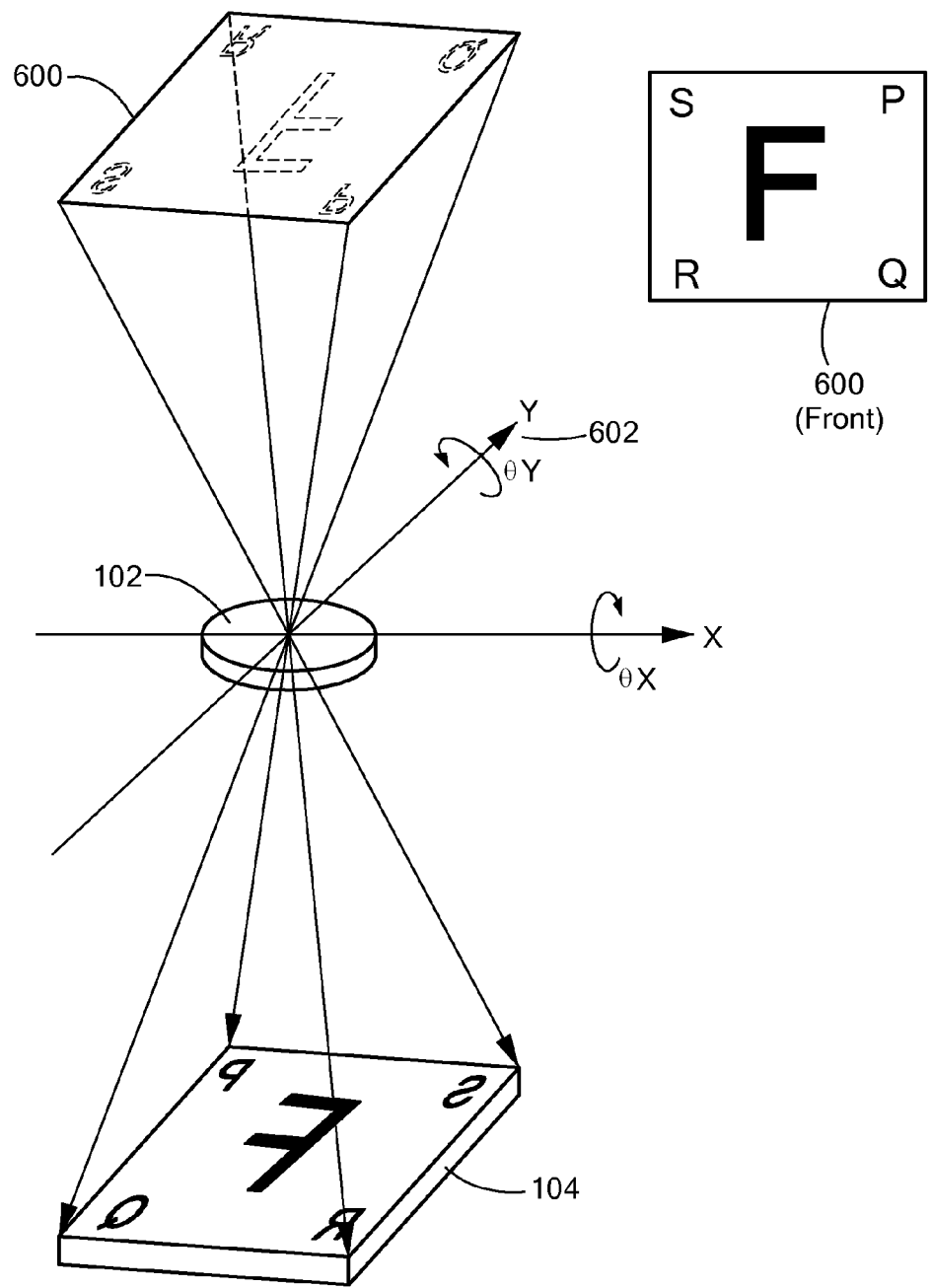
FIG. 6 is a perspective schematic illustration of a target, lens and image sensor, as well as possible rotations of the lens about two axes.

As shown schematically in FIG. 6 (using a different target 600 for clarity, but maintaining assumptions about lens imperfections made above), tilting the lens 102 about the y axis would simultaneously bring the lens 102 closer to, or further from, the portion of the image sensor 104 that images the upper-right corner P and the lower-right corner Q of the target 600, depending on which way (clockwise or counter-clockwise) the lens 102 is tilted about the y axis. Such tilting would also bring the lens 102 further from, or close to, the portion of the image sensor 104 that images the lower-left corner R and the upper-left corner S, but in an opposite sense to that of corners P and Q. Thus, tilting the lens 102 in a negative direction (i.e., opposite the arrow 602) about the y axis moves the focus score curves 504 and 506 to the right, and it moves the focus score curves 500 and 502 to the left.

Similarly, tilting the lens 102 about the x axis would simultaneously bring the lens 102 closer to, or further from, the portion of the image sensor 104 that images the lower-left corner R and the lower-right corner Q and, in an opposite sense, bring the lens 102 further from, or closer to, the portion of the image sensor 104 that images the upper-left corner S and the upper-right corner P, depending on which way (clockwise or counterclockwise) the lens 102 is tilted about the y axis.

Collectively, tipping and tilting the lens 102 as just described brings all the focus score curves 500, 502, 504 and 506 closer together.

As noted, the distances 508, 510, 512 and 514 (FIG. 5) indicate the relative amounts by which the lens 102 should be tipped or tilted to compensate for the misfocused corners. The greater the distance 212 (FIG. 2) between the center 202 and any corner (ex., 206) of the target 200, the less the lens 102 needs to be tipped or tilted, for a given distance 508-514 between the peak 408 of the center focus score curve and a peak in the corner focus score curve 500-506.

Figure 7:
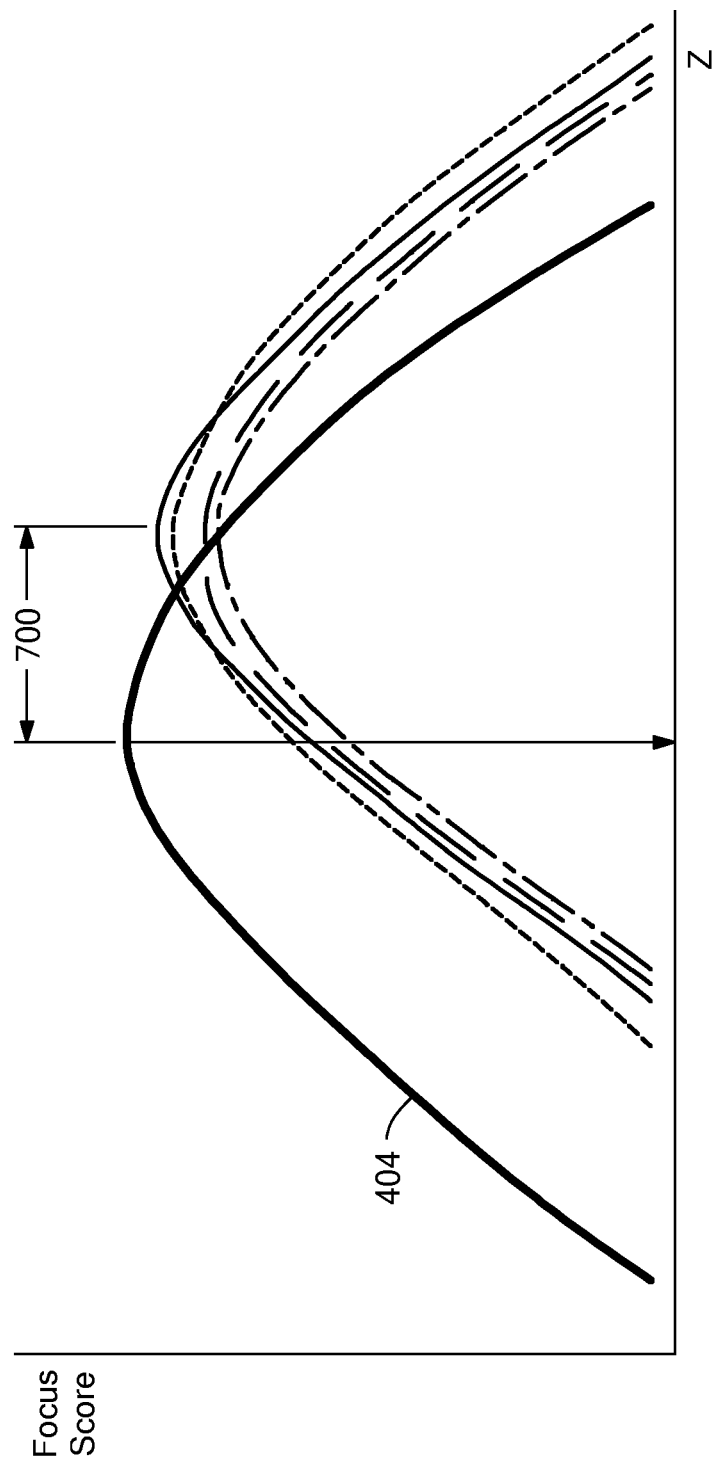
FIG. 7 is a hypothetical graph of center and four corner focus scores, versus z-axis position, similar to the graph of FIG. 6, except for an aligned optical element.

Thus, the tip and tilt of the lens 102 may be adjusted (i.e., two degrees of freedom are available), by which the computer 108 can adjust the lens 102 so that all four corner focus scores peak at the same, or nearly the same, z-axis location, as represented in a hypothetical plot shown in FIG. 7. Plane geometry may be used to calculate the amount by which the lens 102 should be tipped and/or tilted, based on the distances 508-514. Depending on imperfections in the lens, it may not be possible to find a single orientation (i.e., a θx and a θy) that simultaneously maximizes all four corner focus scores. Furthermore, it may not be possible to simultaneously maximize the four corner focus scores and the center focus score. As shown in FIG. 7, the center focus score 404 may peak a z-axis distance 700 from the peak corner focus scores, after the lens 102 orientation has been adjusted.

The computer 108 may, therefore, weight the four corner focus scores and the center focus score to determine a best compromise of positions along, and orientations about, the three axes. The weightings (center to corners) may be selected based on needs for a particular camera assembly. In some embodiments, the center focus score to corner focus score weighting ratio may be 50/50, 60/40, 75/25, 100/0 or any other suitable weighting ratio. Using a weighting ratio of 100/0 optimizes for the center focus score, and it makes the four corner focus score curve peaks coincident (or nearly so), although, as shown in FIG. 7, the corner focus curves may peak at a different z-axis location than the center focus score peaks.

The computer 108 (FIG. 1) may iteratively perform the above-described procedure. For example, in a first pass, the computer 108 may determine a tip and a tilt of the lens 102 that provides an acceptable balance among the four corner focus scores and between the center focus score and the corner focus scores collectively, as described above. Then, in a second pass, the motion control system may cause the robot 100 to tip and tilt the lens 102 according to results of the first pass and perform the above-described procedure again. Optionally, additional iterative passes may be performed.

Optionally, the computer 108 may generate signals to drive the motor(s) and analyze image data from the sensor 104, so as to test operation of an automatic focus, image stabilization or other system in the housing 102/802 or to calibrate such a system (collectively referred to herein as "measure operation of the lens"). In one embodiment, after the lens housing 102/802 has been positioned and oriented, as described above, and optionally after the adhesive has at least partially cured, the computer 108 generates drive signals for the motors to move the optical element to one or more locations and analyzes the image data from the sensor 104.

For example, for an image stabilization or automatic focus system, the computer 108 may cause the optical element to move from its rest position and then evaluate the image data to check for an expected magnitude and direction of image shift or focus score or change thereof commensurate with the magnitude and direction of the movement of the optical element, to thereby verify correct operation of the IS or AF system. Typically, but not necessarily exclusively, the movement of the optical element is along its optical axis for testing, verifying or calibrating automatic focus systems, and the movement is in a plane perpendicular to the optical axis for testing, verifying or calibrating image stabilization systems.

Optionally, the computer 108 may measure the optical shift or focus score or change thereof that results from each of one or more dispositions of the optical element and correlate the optical shifts or focus scores or changes thereof with the dispositions or signals sent to the motors to cause the dispositions, thereby calibrating the IS or AF system. The correlations (calibration data) may then be reported or stored in a memory in the lens, on the substrate 112 (FIG. 1) or elsewhere. Optionally, the target 106 may be moved along the optical axis during an auto focus test or calibration. Optionally, the computer 108 may cause the robot to vibrate the housing 102/802 to test operation of an image stabilization system.

In another embodiment, the computer 108 may evaluate automatic focus and/or image stabilization performance of the lens 102 and then base the final position of the lens partly on this performance and partly on results of the positioning and alignment procedure described above. For example, the computer 108 may determine a rest position for the optical element that results in optimum IS and/or AF performance, and then hold the optical element at that position while it performs the positioning and alignment procedure.

The movement path (trajectory) of the lens 102 under test has been described as being linear or angular (ex., tip or tilt about an axis). However, other 1-, 2- or more dimensional trajectories may be used. Exemplary trajectories include linear, helical, spiral and box.

The image sensor 104 may be fabricated according to various technologies, such as charge-coupled device (CCD) or complementary metal-oxide-semiconductor (CMOS). In addition, the image sensor 104 output may conform to various standards, such as VGA, NTSC, PAL, SMIA, MIPI or HiSPI.

As used herein, the term "lens" means an object with one or more conventional optical elements. Although the descriptions above are generally presented in the context of aligning a lens to an image sensor, the methods and apparatus described herein are equally applicable to aligning other optical elements (such as optical fibers) to other passive optical elements (such as other optical fibers) or to other optical sensors (such as photodiodes) or to optical sources (such as light emitting diodes (LEDs) and lasers). Collectively, all such lenses, image sensors, optical fibers, photodiodes, LEDs, lasers and the like are referred to in the claims as "optical elements." Although alignment of one optical element, such as a lens, to another optical element, such as an image sensor, has been described, the methods and apparatus described herein may be used as described, with appropriate modifications, to align more than one optical element, such as several optical fibers, with a single optical element, such as an optical sensor or an optical source. Furthermore, the aligned optical elements may, but need not, all be mounted on a common substrate, such as a printed circuit board.

As used herein and in the claims, a "processor" may be: a single processor; a multi-processor, such as a multi-core processor or multiple processors interconnected with each other on a single or multiple integrated circuit substrate or on a single or multiple circuit boards; a single computer or multiple interconnected computers. Although some claims recite performing one or more operations "by a processor," it should be understood that: each operation may be performed by a distinct processor; all the operations may be performed by a single processor; any combination of the operations may be performed by any combination of plural processors; performance of a single operation may be distributed over a plurality of the processors; and these and other combinations are within the scope of the claims.

As used in the claims, the term "position of an optical element" means at least one of: a position of the optical element and an orientation of the optical element. That is, the term "position" means position and/or orientation. As used herein, the term "automatic" or "automatically" means performed without human intervention, although a human may initiate the performance. For example, automatically fitting an equation to a set of data requires a processor to determine parameters of the equation, without assistance from a human.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

The motion control system, measurement system, polynomial equation fitter of focus scores, motor control signal generator, floating optical element position sensor signal analyzer and other components and processes described herein can be implemented with software, hardware or a combination thereof. These functions can be performed by a processor executing instructions stored in a memory.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although aspects of embodiments may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, the system may be embodied using a variety of data structures.

What is claimed is:

1. A method for aligning a lens to a digital camera sensor, the lens comprising a housing, a floating optical element disposed within the housing, a plurality of electrical contact points and a motor disposed within the housing, electrically coupled to at least one of the plurality of electrical contact points and configured to move the floating optical element with respect to the housing in response to a signal on the at least one of the plurality of electrical contact points, the method comprising automatically:
    gripping the housing with a robotic jaw;
    robotically touching at least one of the plurality of electrical contact points with a test probe, thereby making a temporary electrical connection between the test probe and the at least one of the plurality of electrical contact points;
    generating a control signal configured to drive the motor, such that the motor moves the floating optical element to a predetermined position;
    supplying the control signal to the test probe;
    using the robotic jaw, scanning the housing along a trajectory, relative to a camera sensor;
    receiving image signals from the camera sensor;
    generating a plurality of time spaced-apart alignment data items from the image signals, each alignment data item of the plurality of time spaced-apart alignment data items being indicative of a degree of alignment between the lens and the camera sensor;
    estimating an alignment position, based on the plurality of time spaced-apart alignment data items;
    causing the robotic jaw to move the housing to the alignment position; and
    fixing the housing in place, relative to the camera sensor.

2. A method according to claim 1, wherein the plurality of electrical contact points are disposed on a flexible printed circuit comprising a plurality of conductive traces and extending from within the housing to a point external to the housing, wherein making the temporary electrical connection between the test probe and the at least one of the plurality of electrical contact points comprises robotically touching at least one of the plurality of conductive traces with the test probe, thereby making a temporary electrical connection between the test probe and the at least one of the plurality of conductive traces.

3. A method according to claim 1, wherein the lens further comprises a position sensor disposed within the housing, configured to generate a signal indicative of a position of the floating optical element and electronically coupled to at least one of the plurality of electrical contact points to send the signal indicative of the position of the floating optical element on the at least one of the plurality of electrical contact points, wherein generating the control signal comprises:
    generating the control signal based at least in part on the signal indicative of the position of the floating optical element.

4. A method according to claim 3, wherein the at least one of the plurality of electrical contact points to which the position sensor is coupled is different than the at least one of the plurality of electrical contact points to which the motor is coupled, the method further comprising:
    robotically touching the second at least one of the plurality of electrical contact points with a second test probe, thereby making a temporary electrical connection between the second test probe and the second at least one of the plurality of electrical contact points; and
    receiving, via the second test probe, the signal indicative of the position of the floating optical element.

5. A method according to claim 1, wherein robotically touching the at least one of the plurality of electrical contact points with the test probe comprises translating the test probe toward the at least one of the plurality of electrical contact points.

6. A method according to claim 5, wherein translating the test probe toward the at least one of the plurality of electrical contact points comprises translating the test probe along an axis perpendicular to an optical axis of the lens.

7. A method according to claim 1, wherein the electrical contact points comprise a flexible printed circuit, the temporary electrical connection between the test probe and the at least one of the plurality of electrical contact points is made on one side of the flexible printed circuit, the lens comprises a structural member disposed on another side of the flexible printed circuit and robotically touching the at least one of the plurality of electrical contact points with the test probe comprises forcing the flexible printed circuit against the structural member.

8. A method according to claim 1, wherein robotically touching the at least one of the plurality of electrical contact points with the test probe comprises causing an end of the test probe to contact the at least one of the plurality of electrical contact points within a perimeter of the housing.

9. A method according to claim 1, wherein robotically touching the at least one of the plurality of electrical contact points with the test probe comprises causing an end of the test probe to contact the at least one of the plurality of electrical contact points within about 5 mm of the housing.

10. A method according to claim 1, wherein the electrical contact points comprise a flexible printed circuit, the method further comprising applying at least a partial vacuum to attract the flexible printed circuit toward the test probe.

11. A method according to claim 1, further comprising:
generating a second control signal configured to drive the motor, such that the motor moves the floating optical element to a second predetermined position;
supplying the second control signal to the test probe; and
measuring operation of the lens while the floating optical element is at the second predetermined position.

12. A robot for aligning a lens to a digital camera sensor, the lens comprising a housing, a floating optical element disposed within the housing, a plurality of electrical contact points and a motor disposed within the housing, electrically coupled to at least one of the plurality of electrical contact points and configured to move the floating optical element with respect to the housing in response to a signal on the at least one of the plurality of electrical contact points, the robot comprising:
a robotic jaw configured to grip the housing;
a test probe configured to robotically touch at least one of the plurality of electrical contact points, thereby making a temporary electrical connection between the test probe and the at least one of the plurality of electrical contact points;
a processor configured to:
generate a control signal configured to drive the motor, such that the motor moves the floating optical element to a predetermined position;
supply the control signal to the test probe;
use the robotic jaw to scan the housing along a trajectory, relative to the camera sensor;
receive image signals from the camera sensor;
generate a plurality of time spaced-apart alignment data items from the image signals, each alignment data item of the plurality of time spaced-apart alignment data items being indicative of a degree of alignment between the lens and the camera sensor;
estimate an alignment position, based on the plurality of time spaced-apart alignment data items;
cause the robotic jaw to move the housing to the alignment position; and
fix the housing in place, relative to the camera sensor.

13. A robot according to claim 12, wherein the plurality of electrical contact points are disposed on a flexible printed circuit comprising a plurality of conductive traces and extending from within the housing to a point external to the housing, the test probe is configured to make the temporary electrical connection between the test probe and the at least one of the plurality of electrical contact points by robotically touching at least one of the plurality of conductive traces with the test probe, thereby making a temporary electrical connection between the test probe and the at least one of the plurality of conductive traces.

14. A robot according to claim 12, wherein the lens further comprises a position sensor disposed within the housing, configured to generate a signal indicative of a position of the floating optical element and coupled to at least one of the plurality of electrical contact points to send the signal indicative of the position of the floating optical element on the at least one of the plurality of electrical contact points, wherein the processor is configured to generate the control signal based at least in part on the signal indicative of the position of the floating optical element.

15. A robot according to claim 14, wherein the position sensor is coupled to a second at least one of the plurality of electrical contact points, different than the at least one of the plurality of electrical contact points to which the motor is coupled, the robot further comprising:
a second test probe configured to robotically touch the second at least one of the plurality of electrical contact points, thereby making a temporary electrical connection between the second test probe and the second at least one of the plurality of electrical contact points;
where the processor is configured to:
receive, via the second test probe, the signal indicative of the position of the floating optical element.

16. A robot according to claim 12, wherein the test probe is configured to translate toward the at least one of the plurality of electrical contact points.

17. A robot according to claim 12, wherein the test probe is configured to translate along an axis perpendicular to an optical axis of the lens.

18. A robot according to claim 12, wherein the electrical contact points comprise a flexible printed circuit, the temporary electrical connection between the test probe and the at least one of the plurality of electrical contact points is made on one side of the flexible printed circuit, the lens comprises a structural member disposed on another side of the flexible printed circuit and the processor and the test probe are configured to force the flexible printed circuit against the structural member.

19. A robot according to claim 12, wherein the processor and the test probe are configured to cause an end of the test probe to contact the at least one of the plurality of electrical contact points within a perimeter of the housing.

20. A robot according to claim 12, wherein the processor and the test probe are configured to cause an end of the test probe to contact the at least one of the plurality of electrical contact points within about 5 mm of the housing.

21. A robot according to claim 12, wherein the electrical contact points comprise a flexible printed circuit, the robot further comprising a vacuum nozzle proximate the test probe, oriented toward the flexible printed circuit and configured to apply at least a partial vacuum to attract the flexible printed circuit toward the test probe.

22. A robot according to claim 12, wherein the processor is configured to:
- generate a second control signal configured to drive the motor, such that the motor moves the floating optical element to a second predetermined position;
- supply the second control signal to the test probe; and
- measure operation of the lens while the floating optical element is at the second predetermined position.

* * * * *